United States Patent
Kikuchi et al.

(10) Patent No.: US 10,725,165 B2
(45) Date of Patent: Jul. 28, 2020

(54) DISTANCE MEASURING DEVICE, WATER LEVEL MEASUREMENT SYSTEM, AND DISTANCE MEASUREMENT METHOD

(71) Applicant: FUJITSU LIMITED, Kawasaki-shi, Kanagawa (JP)

(72) Inventors: Yoshio Kikuchi, Ninomiya (JP); Osamu Tsuboi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 297 days.

(21) Appl. No.: 15/913,979

(22) Filed: Mar. 7, 2018

(65) Prior Publication Data
US 2018/0259633 A1    Sep. 13, 2018

(30) Foreign Application Priority Data
Mar. 13, 2017   (JP) .................................. 2017-047121

(51) Int. Cl.
*G01S 13/34*    (2006.01)
*G01F 23/284*   (2006.01)
(Continued)

(52) U.S. Cl.
CPC .......... *G01S 13/34* (2013.01); *G01F 23/0076* (2013.01); *G01F 23/284* (2013.01);
(Continued)

(58) Field of Classification Search
CPC ........ G01S 13/34; G01S 13/88; G01S 13/343; G01S 7/4026; G01F 23/0076; G01F 23/284; G01F 22/00
(Continued)

(56) References Cited

U.S. PATENT DOCUMENTS

| 5,266,956 A | * | 11/1993 | Canal | .................... G01S 13/343 342/128 |
| 6,856,280 B1 | * | 2/2005 | Eder | ....................... G01S 13/48 342/118 |

(Continued)

FOREIGN PATENT DOCUMENTS

| JP | 2000-055716 |   | 2/2000 |
| JP | 2000055716 A | * | 2/2000 |
| JP | 2007-078518 |   | 3/2007 |
| JP | 2007078518 A | * | 3/2007 |
| JP | 2010-528317 |   | 8/2010 |
| JP | 2010528317 A | * | 8/2010 |

OTHER PUBLICATIONS

Shingo Fujimori, Tetsuji Uebo, and Tadamitsu Iritani, "Short-Range High-Resolution Radar Utilizing Standing Wave for Measuring of Distance and Velocity of a Moving Target", Electronics and Communications in Japan, Part 1, vol. 89, No. 5, 2006 (Year: 2006) (Year: 2006).*

*Primary Examiner* — Peter M Bythrow
*Assistant Examiner* — Alexander L. Syrkin
(74) *Attorney, Agent, or Firm* — Fujitsu Patent Center (57) ABSTRACT

A distance measuring device includes one or more processors configured to: detect a wave formed by synthesizing a frequency-swept electromagnetic wave transmitted to an object with a wave reflected on the object; measure, based on the synthesized wave, a distance to the object; calculate a displacement-caused inclination, caused by the displacement of the object, of a power spectrum of the synthesized wave; and measure the distance based on a signal in which the displacement-caused inclination has been removed from the power spectrum.

20 Claims, 3 Drawing Sheets

(51) Int. Cl.
  *G01S 7/40* (2006.01)
  *G01F 23/00* (2006.01)
  *G01S 13/88* (2006.01)
  *G01F 22/00* (2006.01)

(52) U.S. Cl.
  CPC .......... *G01S 7/4026* (2013.01); *G01S 13/343* (2013.01); *G01S 13/88* (2013.01); *G01F 22/00* (2013.01)

(58) Field of Classification Search
  USPC ........................................................ 342/124
  See application file for complete search history.

(56) References Cited

U.S. PATENT DOCUMENTS

| | | | | |
|---|---|---|---|---|
| 2005/0018170 | A1* | 1/2005 | Fujimori | G01S 17/36 356/4.01 |
| 2007/0013578 | A1* | 1/2007 | Iritani | G01S 13/36 342/118 |
| 2008/0297403 | A1* | 12/2008 | Akerstrom | G01F 23/284 342/175 |
| 2009/0251360 | A1* | 10/2009 | Uebo | G01S 13/32 342/129 |
| 2010/0070207 | A1* | 3/2010 | Sai | G01F 23/284 702/55 |
| 2010/0175470 | A1* | 7/2010 | Schrier | G01F 23/284 73/290 V |

* cited by examiner

FIG. 5C
Center

FIG. 5D
Bottom

FIG. 5E

ND DISTANCE MEASUREMENT METHOD

DISTANCE MEASURING DEVICE, WATER LEVEL MEASUREMENT SYSTEM, AND DISTANCE MEASUREMENT METHOD

CROSS-REFERENCE TO RELATED APPLICATION

This application is based upon and claims the benefit of priority of the prior Japanese Patent Application No. 2017-47121, filed on Mar. 13, 2017, the entire contents of which are incorporated herein by reference.

FIELD

The embodiment discussed herein is related to a distance measuring device, a water level measurement system, and a distance measurement method.

BACKGROUND

Traditionally, a distance measuring device that transmits a frequency-swept electromagnetic wave to an object to be measured and measures the distance between the distance measuring device and the object using a wave reflected on the object has been developed. For example, there is a method for receiving a reflected wave while continuously changing the frequency of a wave such as a millimeter wave or a microwave, estimating a time period for the reciprocation of the reflected wave based on a frequency difference (beat frequency) between the transmitted wave and the reflected wave, and calculating a distance corresponding to the time period. This distance measurement method is also referred to as frequency modulated continuous wave (FMCW) scheme (refer to Japanese Laid-open Patent Publication No. 2000-055716, Japanese Laid-open Patent Publication No. 2007-078518, and Japanese National Publication of International Patent Application No. 2010-528317).

A distance measurement method such as the aforementioned FMCW scheme assumes that an object targeted for distance measurement is in a stationary state (or quasi-stationary state). Thus, when the object targeted for the distance measurement is moving, it is hard to improve the accuracy of analysis due to an effect of a Doppler shift component. Especially, in the measurement of a water level such as a water surface or a liquid surface, a distance measurement error easily occurs due to the fluctuation of a liquid surface and it is difficult to measure the water level with high accuracy.

SUMMARY

According to an aspect of the embodiments, the invention is directed to a distance measuring device that more accurately measures distance, particularly when an object targeted for distance measurement is moving. The invention overcomes inaccuracies of known measuring devices that are unable to determine water levels due to an effect of a Doppler shift component. The invention improves the accuracy of distance measurement by detecting a wave formed by synthesizing a frequency-swept electromagnetic wave transmitted to an object with a wave reflected on a surface of the object The invention measures, based on the synthesized wave, a distance to the object The invention calculates a displacement-caused inclination, caused by the displacement of the object, of a power spectrum of the synthesized wave and measures the distance based on a signal in which the displacement-caused inclination has been removed from the power spectrum.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Hereinafter, a distance measuring device, a water level measurement system, and a distance measurement method according to an embodiment are described with reference to the accompanying drawings. An object to be measured by the distance measuring device according to the embodiment is a liquid surface (water surface), and a liquid level (water level) is measured based on the distance between the distance measuring device and the liquid surface. The following embodiment, however, is an example and does not intend to remove the application of various modifications and techniques that are not clarified in the embodiment. Specifically, the embodiment may be variously modified (for example, by combining the embodiment and a modified example) without departing from the gist of the embodiment.

1. Configuration

Figure 1:
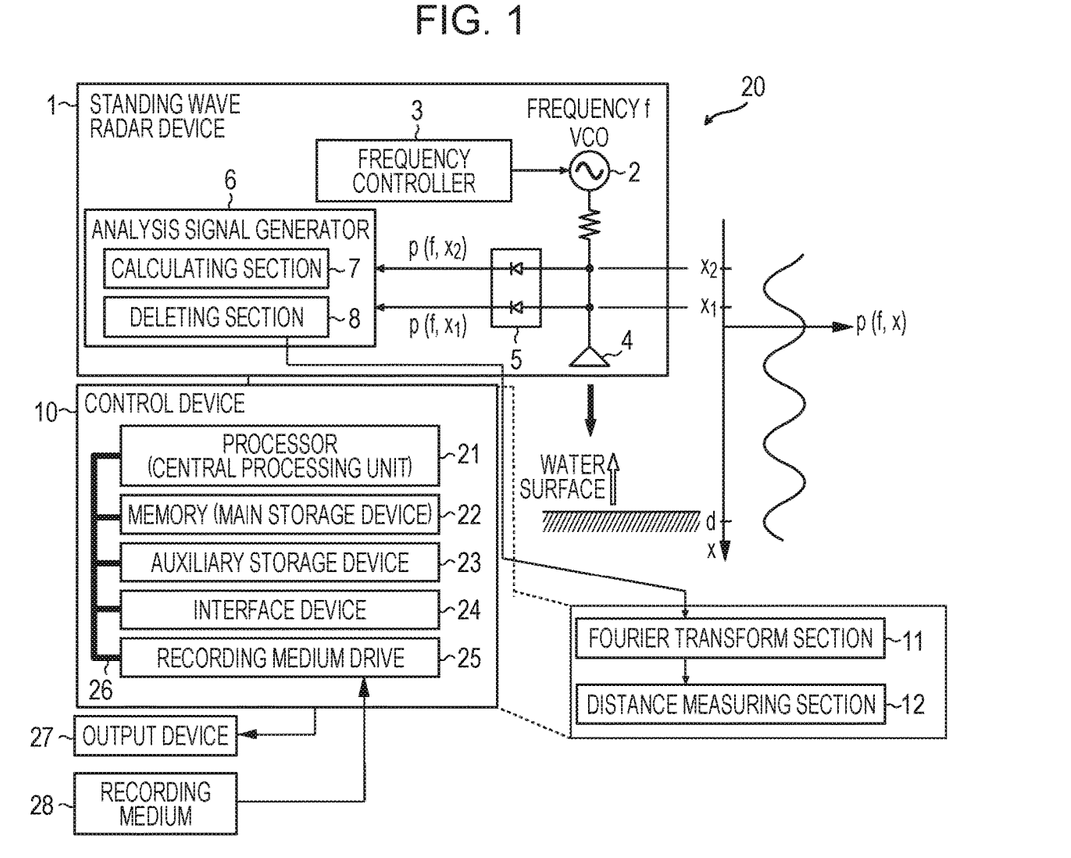
FIG. 1 is a diagram illustrating a distance measuring device and a water level measurement system according to an embodiment.

FIG. 1 is a diagram illustrating a configuration of a water level measurement system 20 (water level sensing system or water level sensor system) using a standing wave radar device 1. The water level measurement system 20 includes the standing wave radar device 1 and a control device 10 connected to the standing wave radar device 1. The water level measurement system 20 according to the embodiment uses a contactless distance measurement method and is installed at a position (for example, on the back side of a maintenance hole lid) away from the water surface. The standing wave radar device 1 may include a known Doppler sensor module.

The standing wave radar device 1 includes a voltage-controlled oscillator (VCO) 2, a frequency controller 3, an antenna 4, a wave detector 5, and an analysis signal generator 6 that are unified as a module. The voltage-controlled oscillator 2 is a signal oscillator (frequency modulator (FM)) that oscillates while sweeping the frequency of an electromagnetic wave to be output from the antenna 4. The frequency controller 3 controls the frequency of a signal generated by the voltage-controlled oscillator 2. The antenna 4 is a transceiver that has a function of outputting the frequency-swept electromagnetic wave (transmitted wave) and receiving and detecting a reflected wave. The antenna 4 according to the embodiment is a patch antenna (microstrip antenna).

The voltage-controlled oscillator 2 outputs, to the antenna 4, an oscillation signal based on a control signal transmitted by the frequency controller 3. The antenna 4 outputs (transmits) an electromagnetic wave based on the oscillation signal transmitted from the frequency controller 3. The electromagnetic wave output from the antenna 4 is a continuous wave (CW), and a central frequency $f_0$ of the electromagnetic wave output from the antenna 4 is, for example, 24.0 GHz or higher. In addition, a sweeping level $f_w$ by which the frequency of the electromagnetic wave is swept is 200 MHz or less, and a frequency band is in a range from $(f_0-(f_w/2))$ to $(f_0+(f_w/2))$. The frequency difference between the central frequency $f_0$ and a sweep central frequency upon frequency sweep is expressed by $f_d$. Specifically $-(f_w/2) \leq f_d \leq (f_w/2)$. The frequency f of the transmitted wave may be expressed by $(f_0+f_d)$ (=f).

The signal level of a wave (specifically, an electromagnetic wave generated due to the interference of the transmitted wave with a received wave, or a standing wave) formed by synthesizing the transmitted wave with the reflected wave is detected by the wave detector 5. The wave detector 5 acquires, as a power signal p, a square value of a signal voltage of the synthesized wave. The power signal p may be described using a function p(f, x) of the frequency f of the transmitted wave and coordinates x of an observation point. The wave detector 5 according to the embodiment has a function as a quadrature detector for separating the synthesized wave into real-part data and imaginary-part data and acquires two power signals p using a quadrature wave detection scheme. Specifically, the wave detector 5 detects the power signals p at two observation points $x_1$ and $x_2$ on an x axis illustrated in FIG. 1. The phase of the power signal $p(f, x_1)$ detected at the observation point $x_1$ is orthogonal to the phase of the power signal $p(f, x_2)$ detected at the observation point $x_2$. The former power signal $p(f, x_1)$ corresponds to the real-part data of the synthesized wave, while the latter power signal $p(f, x_2)$ corresponds to the imaginary-part data of the synthesized wave. The analysis signal generator 6 is an analog-to-digital (A/D) converter that generates analysis signals based on the power signals p detected by the wave detector 5. In another embodiment, an analyzed signal generator 6 may include a processor. In embodiments, at least some of the processes may be performed processors other than the CPU, for example, dedicated processors such as a digital signal processor (DSP), a graphics processing unit (GPU), a numerical calculation processor, a vector processor, and an image processing processor. At least some of the processes may be performed by an integrated circuit (IC) and other digital circuits. At least a part of each of the sections may include an analog circuit. The integrated circuit includes a large-scale integration (LSI), an application specific integrated circuit (ASIC), and a programmable logic device (PLD). The PLD includes, for example, a field-programmable gate array (FPGA). Each of the sections may be a combination of a processor and an integrated circuit. The combination is called, for example, a micro controller (MCU), a system-on-a-chip (SoC), a system LSI, or a chip set.

The analysis signal generator 6 calculates displacement-caused inclinations, included in the power signals p, of the synthesized wave and removes the displacement-caused inclinations from the power signals p. An A/D conversion process or the analysis signal generator 6 may be executed before the removal of the displacement-caused inclinations or may be executed after the removal of the displacement-caused inclinations. The analysis signals output from the analysis signal generator 6 may be digital signals.

Figure 2A:
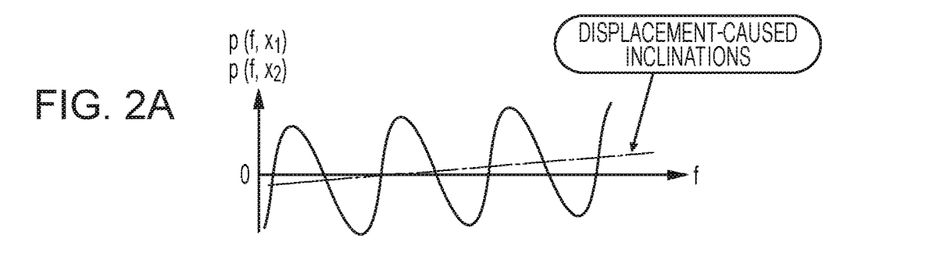
FIG. 2A is a diagram illustrating power spectra and displacement-caused inclinations of the power spectra.

The "displacement-caused inclinations of the synthesized wave" are "inclinations, caused by the displacement of the object to be measured, of the power signals p". The analysis signal generator 6 includes a calculating section 7 and a deleting section 8. The calculating section 7 is configured to calculate the displacement-caused inclinations (inclinations of the power signals p). As a method for calculating the displacement-caused inclinations, two methods are exemplified below. The first method is to calculate the displacement-caused inclinations by executing regression analysis on power spectra, as illustrated in FIG. 2A. The displacement-caused inclinations correspond to inclinations obtained by approximating the power spectra to straight lines (regression lines), as indicated by an alternate long and short dashed line in FIG. 2A. The regression lines may be calculated using a least-square method. "Power spectrum" is intensity changes of synthesized waves.

The second method is to analytically calculate the displacement-caused inclinations. Specifically, displacement components V of the power spectra may be analytically calculated as the displacement-caused inclinations. First, the power spectrum (real-part data) in the case where the position of the wave detector 5 is the origin (x=0) is expressed by the Equation (1). In Equation (1), A is an amplitude level of the transmitted wave, d is the distance between the standing wave radar device 1 (antenna 4) and the object to be measured, c is the speed of light, and $\phi$ is the amount of a change in the phase due to the reflection. The frequency f of the transmitted wave may be expressed by the sum of the central frequency $f_0$ (CW component) and the frequency difference $f_d$ between the central frequency $f_0$ and a frequency-swept component. In the case where a central value of the distance d when the distance d slightly fluctuates is $d_0$, and the displacement is $\Delta d$, the distance d may be expressed by $(d_0+\Delta d)$ (=d). Since $f_0 \gg f_d$, Equation (1) may be expressed by Equation (2).

$$p(f, 0) = 2A^2 \cos\left(\frac{4\pi f d}{c} - \phi\right) \quad (1)$$

$$\begin{aligned} p(f, 0) &= 2A^2 \cos\left\{\frac{4\pi\{f_0 + f_d(t)\}(d_0 + \Delta d(t))}{c} - \phi\right\} \\ &= 2A^2 \cos\left\{\frac{4\pi f_0 d_0}{c} + \frac{4\pi f_d d_0}{c} + \frac{4\pi f_0 \Delta d(t)}{c} + \frac{4\pi f_d \Delta d(t)}{c} - \phi\right\} \\ &\approx 2A^2 \cos\left\{\frac{4\pi f_0 d_0}{c} + \frac{4\pi f_d d_0}{c} + \frac{4\pi f_0 \Delta d(t)}{c} - \phi\right\} \\ &= 2A^2 \cos\left\{\frac{4\pi f d_0}{c} + \frac{4\pi f_0 \Delta d(t)}{c} - \phi\right\} \end{aligned} \quad (2)$$

It is assumed that, during a time period for the modulation of the transmitted wave or a very short time period of approximately 1 millisecond, the displacement $\Delta d$ of the object to be measured is proportional to time. Equation (3) is obtained by substituting $\Delta d=Bt$ into Equation (2). Note B is a constant and t is time. In addition, values in the second and later items when the trigonometric function is expanded by Taylor expansion are very small. Thus, if the values in the second and later items are ignored, cos x may be approximated to 1, and sin x may be approximated to x. By using approximate equations cos x=1 and sin x=x, Equation (4) is obtained from Equation (3). The first item of Equation (4) is an item (or static distance analysis signal) that is not affected by an effect of the displacement Δd, while the second item of Equation (4) is an item affected by the effect of the displacement Δd. Thus, a displacement component V of the power spectrum in a real-part region of the synthesized wave may be calculated using Equation (5).

$$p(f, 0) = 2A^2 \cos\left\{\frac{4\pi f d_0}{c} - \phi + \frac{4\pi f_0 B t}{c}\right\} \quad (3)$$

$$p(f, 0) = 2A^2 \cos\left(\frac{4\pi f d_0}{c} - \phi\right) \cdot \cos\left(\frac{4\pi f d_0 B t}{c}\right) - \sin\left(\frac{4\pi f d_0}{c} - \phi\right) \cdot \sin\left(\frac{4\pi f d_0 B t}{c}\right)$$

$$\approx 2A^2 \cos\left(\frac{4\pi f d_0}{c} - \phi\right) - 2A^2 \sin\left(\frac{4\pi f d_0}{c} - \phi\right) \cdot \frac{4\pi f_0 B}{c} t \quad (4)$$

$$V = 2A^2 \sin\left(\frac{4\pi f d_0}{c} - \phi\right) \cdot \frac{4\pi f_0 B}{c} t \quad (5)$$

The calculating section 7 according to the embodiment calculates a displacement-caused inclination for the real-part data of the power signal p detected by the wave detector 5 and a displacement-caused inclination for the imaginary-part data of the power signal p detected by the wave detector 5. For example, the calculating section 7 calculates, as a "real-part inclination", the displacement-caused inclination of the power signal $p(f, x_1)$ of the real-part data and calculates, as an "imaginary-part inclination", the displacement-caused inclination of the power signal $p(f, x_2)$ of the imaginary-part data. The aforementioned Equations (1) to (5) correspond to a procedure for processing the real-part data, but a procedure for processing the imaginary-part data is the same as or similar to the procedure for processing the real-part data. Since the imaginary-part data and the real-part data have an orthogonal relation, a displacement component V of the power spectrum in an imaginary-part region of the synthesized wave may be calculated using the following Equation (6).

$$V = 2A^2 \cos\left(\frac{4\pi f d_0}{c} - \phi\right) \cdot \frac{4\pi f_0 B}{c} t \quad (6)$$

The aforementioned first and second methods may be used in combination. For example, the displacement-caused inclinations may be calculated using the two methods, and average values, intermediate values, or the like of the displacement-caused inclinations may be calculated as "final displacement-caused inclinations". The calculating section 7 transmits information of the calculated displacement-caused inclinations to the deleting section 8. A theoretical equation of the power spectrum in the case where the single object is to be measured and a position at which the object is detected is 0 (x=0) is described as the following Equation (7). In Equation (7), $V_T$ is the amplitude of the transmitted wave, $V_R$ is the amplitude of the reflected wave, and γ is a reflection coefficient.

$$p(f, 0) = |V_T(f, 0) + V_R(f, 0)|^2 \quad (7)$$

$$\approx A^2 + 2A^2 \gamma \cos\left(\frac{4\pi f d_0}{c} - \phi\right)$$

The actual distance d and the frequency f change depending on time t. When an average distance between the object to be measured and the standing wave radar device 1 during a measurement time period (t) is $d_{ave}$, an average velocity of the transmitted wave during the measurement time period (t) is v, an average frequency of the transmitted wave during the measurement time period (t) is $f_{ave}$, and the Doppler shift of the frequency is $f_{dop}$, the following Equations (8) and (9) are established. By substituting Equations (8) and (9) into Equation (7), Equation (10) is obtained.

$$d = d_{ave} + vt \quad (8)$$

$$f = f_{ave} + f_{dop} \quad (9)$$

$$p(f, 0) \approx A^2 + 2A^2 \gamma \cos\left(\frac{4\pi f d_0}{c} - \phi\right) \quad (10)$$

$$= A^2 + 2A^2 \gamma \cos\left\{\frac{4\pi (f_{ave} + f_{dop})(d_{ave} + vt)}{c} - \phi\right\}$$

When the object to be measured remains still, the standing wave radar device 1 outputs a signal along the horizontal axis (x axis). Thus, Equation (10) may be expressed by Equation (11). Specifically, differences between Equations (10) and (11) reflect the effect (including a DC component of a circuit) of the displacement. In the embodiment, Equation (11) defines a static distance analysis signal, and inclination correction is executed using a regression line to obtain the signal to be output by the standing wave radar device 1. In addition, the inclination correction is executed on the imaginary-part data (sin component) in the same process.

$$p(f, 0) \approx \cos\left(\frac{4\pi f_{ave} d_{ave}}{c} - \phi\right) \quad (11)$$

Figure 2B:
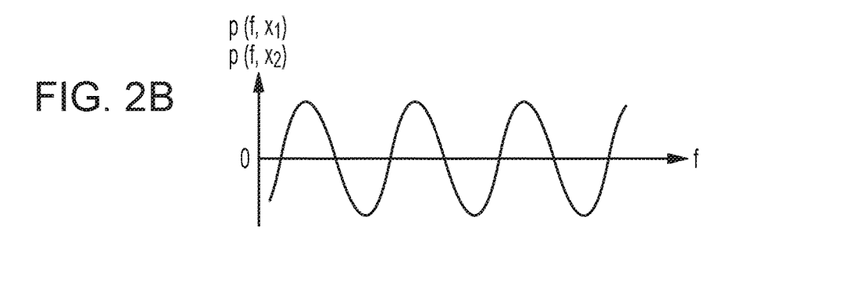
FIG. 2B is a diagram illustrating the power spectra from which the displacement-caused inclinations have been removed.

The deleting section 8 is configured to output the analysis signals in which the displacement-caused inclinations calculated by the calculating section 7 have been removed. FIG. 2A illustrates an example of the power spectra of the power signals p input to the analysis signal generator 6. The displacement-caused inclinations of the power spectra upwardly extend (or downwardly extend) from the left side of the graph illustrated in FIG. 2A to the right side of the graph illustrated in FIG. 2A. FIG. 2B illustrates an example of the power spectra of the power signals p from which the displacement-caused inclinations have been removed. By removing displacement-caused inclination components, the displacement-caused inclinations are removed from the graph and distortions of the power spectra are corrected. Specifically, the distortions of the power spectra due to the fluctuation of the object that is to be measured and on which the transmitted wave has been reflected are removed, and a measurement error of the distance d is reduced.

The deleting section 8 according to the embodiment outputs, for the real-part data and imaginary-part data of the power signals p, the analysis signals in which the displacement-caused inclinations have been removed. For example, the deleting section 8 outputs, as a "real-part analysis signal", an analysis signal in which the real-part inclination has been removed from the power signal $p(f, x_1)$ of the real-part data, and the deleting section 8 outputs, as an "imaginary-part analysis signal", an analysis signal in which the imaginary-part inclination has been removed from the power signal $p(f, x_2)$ of the imaginary-part data. The analysis signals output from the deleting section 8 are transmitted to the control device 10.

Figure 3:
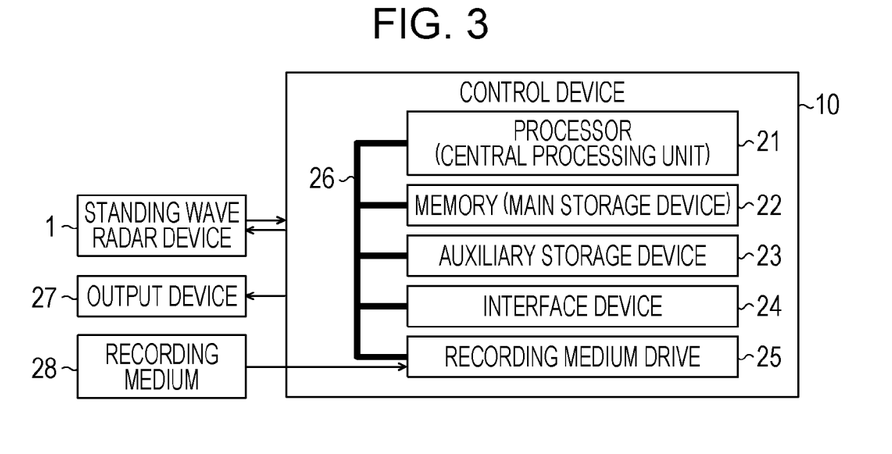
FIG. 3 is a diagram illustrating a hardware configuration of a control device.

The control device 10 (measuring section) is a computer configured to measure and calculate the distance d from the standing wave radar device 1 to the object to be measured, based on the analysis signals (or signals in which the displacement-caused inclinations have been removed from the power spectra of the synthesized wave) transmitted from the standing wave radar device 1. FIG. 3 exemplifies a hardware configuration of the control device 10. The control device 10 includes a processor 21, a memory 22 (main storage device or main memory), an auxiliary storage device 23, an interface device 24, and a recording medium drive 25, which communicate with each other via an internal bus 26 and are connected to each other via the internal bus 26.

The processor 21 is a general-purpose central processing unit (CPU) or a digital signal processor (DSP) and includes a control unit (control circuit), a computing unit (computing circuit), and a cache memory (register group). The processor 21 may be similar to the processor included in the analyzed signal generator 6. The processor 21 and the processor included in the analyzed signal generator 6 may be the same processor, or a part of process of the processor included in the analyzed signal generator 6 and a part of processes of processor 21 may be commonly used.

The memory 22 is a storage device in which a program and data that is being processed are stored. Examples of the memory 22 include a read only memory (ROM) and a random access memory (RAM). The auxiliary storage device 23 is a storage device in which firmware and data held during a longer time period than that during which the data is stored in the memory 22 are stored. Examples of the auxiliary storage device 23 include nonvolatile memories such as a flash memory and an electrically erasable programmable read only memory (EEPROM). The interface device 24 controls input and output (I/O) between the control device 10 and an external.

The recording medium drive 25 is a reading device (or reading and writing device) having a function of reading information recorded and stored in a recording medium 28 (removable medium) such as an optical disc or a semiconductor memory. A program to be executed by the control device 10 may be recorded and stored in the memory 22 or recorded and stored in the auxiliary storage device 23. Alternatively, the program may be recorded and stored on the recording medium 28, and the program written to the recording medium 28 may be read and executed by the control device 10 via the recording medium drive 25.

The control device 10 is connected to the aforementioned standing wave radar device 1 and an output device 27. The connection is arbitrary. The control device 10 may be connected to the standing wave radar device 1 and the output device 27 wirelessly or via cables. Specific examples of the output device 27 are a display device and a printer device. As illustrated in FIG. 1, the distance measurement program to be executed by the control device 10 includes a Fourier transform section 11 and a distance measuring section 12. The sections 11 and 12 are separated from each other for a descriptive purpose and are functions of the distance measurement program and may be described as programs independent of each other or may be described as a complex program having these functions.

The Fourier transform section 11 calculates a distance spectrum $|P(x)|$ by executing a Fourier transform process on the analysis signals transmitted by the standing wave radar device 1. The distance measuring section 12 calculates the distance d that leads to a peak position of the distance spectrum $|P(x)|$ calculated by the Fourier transform section 11.

Circles of the analysis signals are inversely proportional to the distance d. Thus, the distance d that leads to the peak position of the distance spectrum $|P(x)|$ calculated by the Fourier transform section 11 is the distance d from the standing wave radar device 1 to the object to be measured. In the embodiment, the control device 10 executes the Fourier transform process after an analysis signal of a complex number is generated by synthesizing the real-part analysis signal transmitted from the deleting section 8 with the imaginary-part analysis signal transmitted from the deleting section 8, and the control device 10 outputs information of the distance d corresponding to the peak position of the distance spectrum $|P(x)|$ to the output device 27. Known computation methods may be used as a method for generating the analysis signal of the complex number and a specific method for calculating the distance d from the analysis signals.

2. Flowchart

Figure 4:
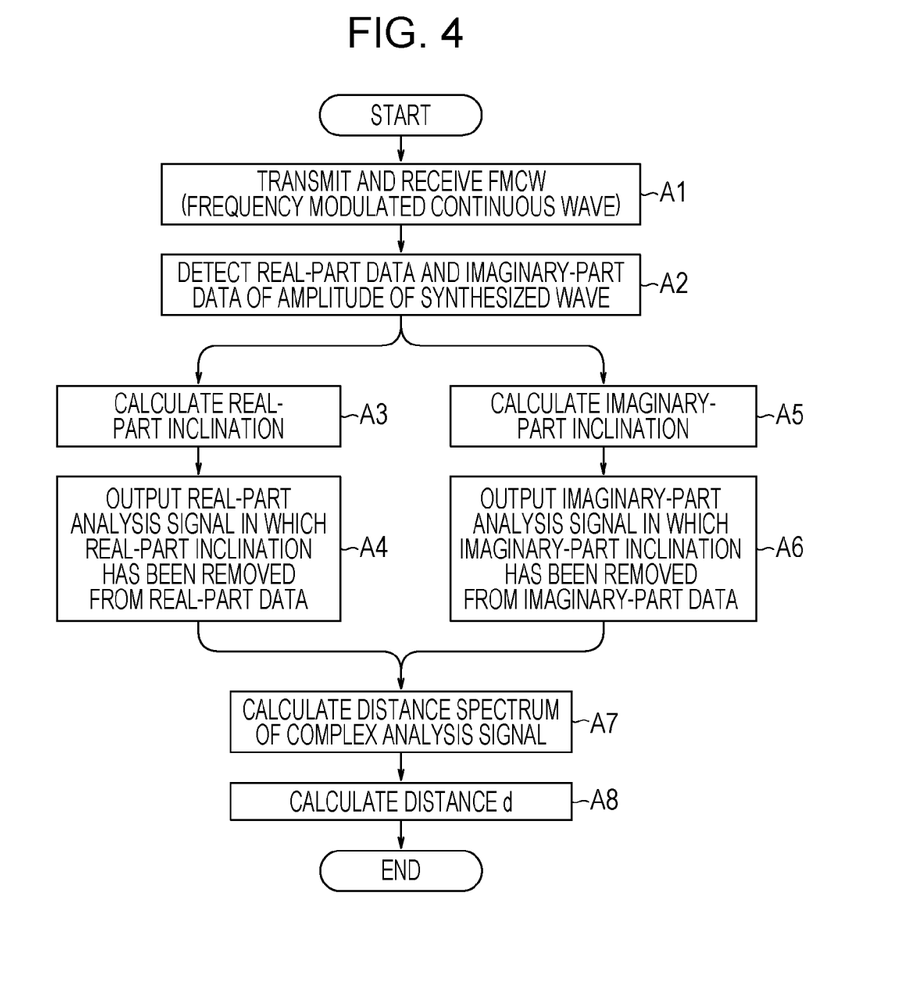
FIG. 4 is a flowchart describing a distance measurement method.

FIG. 4 is a flowchart describing the distance measurement method according to the embodiment. First, a frequency modulated continuous wave (FMCW) is transmitted from the antenna 4 of the standing wave radar device 1 toward the water surface (liquid surface). The transmitted wave is an electromagnetic wave whose frequency has been swept. Then, a wave reflected on the water surface is received by the antenna 4 (in step A1). Subsequently, the wave detector 5 detects a wave formed by synthesizing the transmitted wave with the reflected wave and separated into real-part data and imaginary-part data. Specifically, the wave detector 5 detects power signals $p(f, x_1)$ and $p(f, x_2)$ corresponding to the real-part data and imaginary-part data of the synthesized wave (in step A2). The phases of the power signal $p(f, x_1)$ is orthogonal to the phase of the power signal $p(f, x_2)$.

Processes of steps A3 and A4 are related to the power signal $p(f, x_1)$ of the real-part data. The calculating section 7 calculates, as a real-part inclination, a displacement-caused inclination of the power signal $p(f, x_1)$ of the real-part data (in step A3). The real-part inclination may be calculated by calculating a regression line related to the spectrum of the power signal $p(f, x_1)$ or may be analytically calculated using the aforementioned Equations (5) and (6). The deleting section 8 calculates an analysis signal in which the real-part inclination has been removed from the power signal $p(f, x_1)$ of the real-part data, and the deleting section 8 outputs the calculated analysis signal as a real-part analysis signal to the control device 10 (in step A4).

Processes of steps A5 and A6 are related to the power signal $p(f, x_2)$ of the imaginary-part data. The processes of steps A5 and A6 may be executed in parallel with the processes of steps A3 and A4 or may be sequentially executed (before or after the processes of steps A3 and A4). The calculating section 7 calculates, as an imaginary-part inclination, a displacement-caused inclination of the power signal $p(f, x_2)$ of the imaginary-part data (in step A5). The imaginary-part inclination may be calculated by calculating a regression line related to the spectrum of the power signal p(f, $x_2$) or may be analytically calculated using the aforementioned Equations (5) and (6). The deleting section 8 calculates an analysis signal in which the imaginary-part inclination has been removed from the power signal p(f, $x_2$) of the imaginary-part data, and the deleting section 8 outputs the calculated analysis signal as an imaginary-part analysis signal to the control device 10 (in step A6).

The Fourier transform section 11 of the control device 10 generates a complex analysis signal by synthesizing the real-part analysis signal with the imaginary-part analysis signal and calculates the distance spectrum |P(x)| by executing the Fourier transform process on the complex analysis signal (in step A7). The distance measuring section 12 calculates the distance d that leads to the peak position of the distance spectrum |P(x)| (in step A8), and the distance measuring section 12 outputs information of the calculated distance d to the output device 27. The output distance d is based on the analysis signals in which the real-part inclination and the imaginary-part inclination have been removed and is measured and calculated with high accuracy.

3. Notes

FIGS. 5A to 5E are graphs illustrating the results of conducting an experiment using the aforementioned water level measurement 20 according to the embodiment. In this experiment, the water level has been gradually increased so that the distance from the standing wave radar device 1 to the water surface changes from 166 centimeters (cm) to 119 cm, and the accuracy of the measurement of the distance to the water surface has been confirmed. The speed at which the water surface is increased was several millimeters or less per second (for example, 0.5 to 0.6 (millimeters/s)), and the water surface has been increased so that a wave did not occur on the water surface.

Figure 5A:
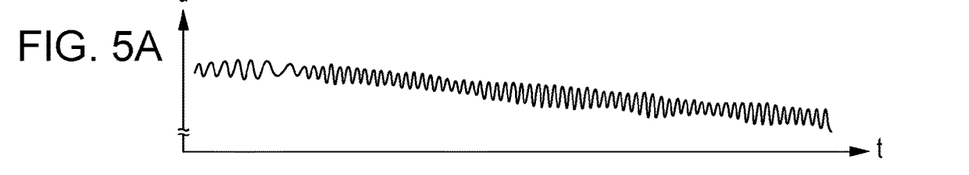
FIG. 5A is a graph illustrating the results of measuring a water level.

FIG. 5A illustrates a change in the distance d over time without the removal of the displacement-caused inclinations. It is apparent from a graph illustrated in FIG. 5A that a measured value of the distance d slightly fluctuates over time but is gradually reduced over time. The slight fluctuation in the measured value of the distance d is caused by errors. When the distance from the standing wave radar device 1 to the object to be measured is gradually changed, and the object to be measured does not actually fluctuate, the results of measuring the distance to the object to be measured indicate that the distance to the object to be measured slightly fluctuates over time.

Figure 5B:
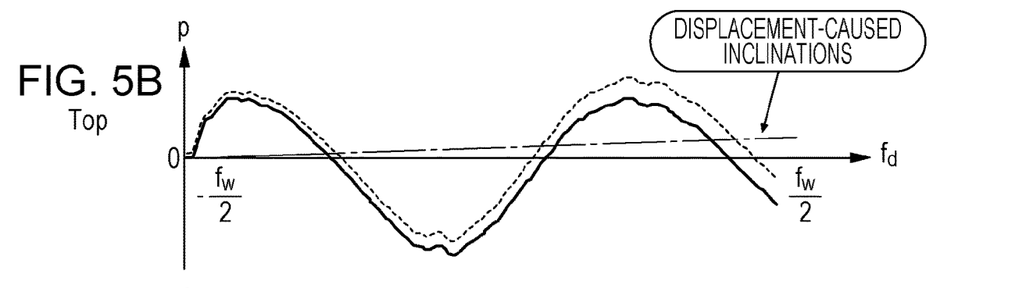
FIGS. 5B to 5D are graphs illustrating power spectra and displacement-caused inclinations of the power spectra.

A solid line illustrated in FIG. 5B indicates power spectra depicted based on displacement-caused inclinations included in power signals p detected at a top point (top position) on a line indicating a certain fluctuation in the measured value of the distance d illustrated in FIG. 5A. In FIG. 5B, an alternate long and short dashed line indicates the displacement-caused inclinations, and a broken line indicates the power spectra from which the displacement-caused inclinations have been removed. Similarly, FIG. 5C indicates displacement-caused inclinations included in power signals p detected at an intermediate point (center position) on the line indicating the certain fluctuation, while FIG. 5D indicates displacement-caused inclinations included in power signals p detected at a bottom point (bottom position) on the line indicating the certain fluctuation. It is apparent that the displacement-caused inclinations correspond to inclinations (regression lines) formed by approximating the power spectra to the straight lines.

Figure 5C:
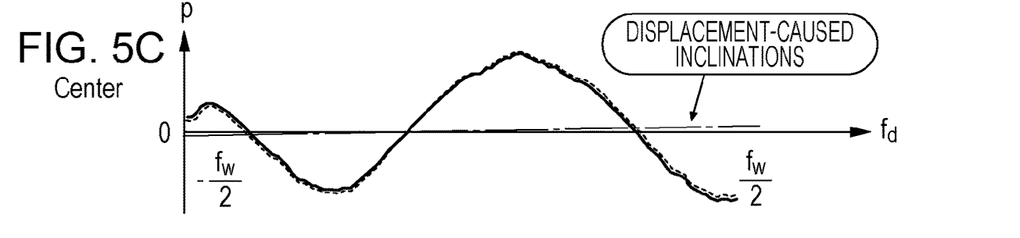
Figure 5D:
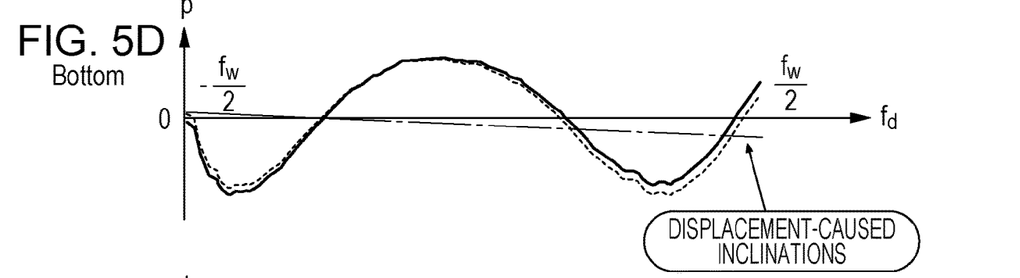
Figure 5E:
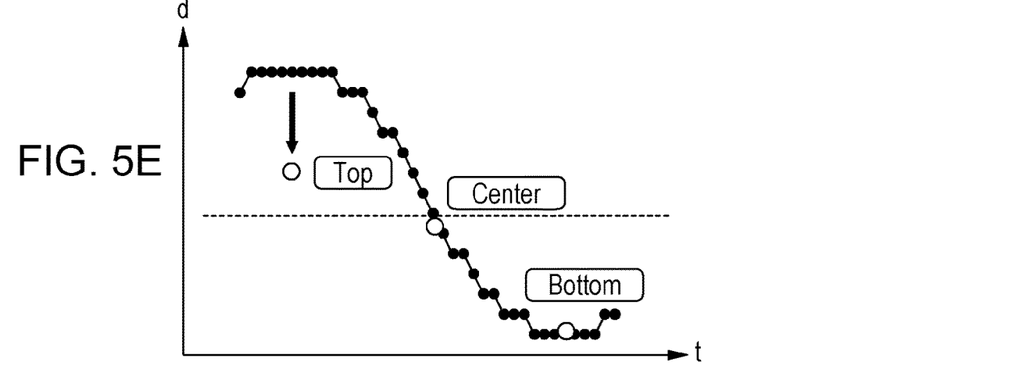
FIG. 5E is a graph illustrating the results of measuring a distance.

FIG. 5E is a graph indicating a change in the distance d calculated when the displacement-caused inclinations illustrated in FIGS. 5B to 5D are removed from the power signals p (real-part data). Black circles and a solid line that are illustrated in FIG. 5E indicate an enlarged portion of a line indicating the slight fluctuation illustrated in FIG. 5A, and a broken line illustrated in FIG. 5E is a true value of the distance d. It has been confirmed that, in the distance measurement based on the power signals p that have been detected at the top position and from which the displacement-caused inclinations illustrated in FIG. 5B have been removed, the distance d is calculated as a value close to the true value.

In the calculation of the distance d, the displacement-caused inclinations have been removed for the real-part data and the imaginary-part data. It has been confirmed that, in the distance measurement based on the power signals p detected at the center position and the bottom position and from which the displacement-caused inclinations illustrated in FIGS. 5C and 5D have been removed, the distance d is not far from the true value. It has been clarified that the analysis results are close to the true value by removing the displacement-caused inclinations from the power signals p.

(1) According to the aforementioned embodiment, a measurement error of the distance d due to a movement of the object to be measured may be reduced by removing the displacement-caused inclinations, which are caused by the displacement of the object to be measured, from the power spectra of the synthesized wave, and the accuracy of the measurement of the distance d may be improved. Especially, in the measurement of a water level such as a water surface or a liquid surface, the distance from the standing wave radar device 1 to the water surface or the liquid surface may be calculated with high accuracy, and the accuracy of the measurement of the water level may be high. In addition, since details of the control and computation are simple, it is easy to reduce operational time, and the distance may be measured with high accuracy by intermittently operating the water level measurement system 20.

It has been pointed out that there is a risk that an unexpected large amount of rain water flows into sewers to cause the flood of sewage due to frequent occurrence of torrential rain in recent years. To take measures, studies have been conducted to use a technique for monitoring water levels by installing pressure type sensors in maintenance holes. The technique is not widely used, since problems, which are caused by substances floating in sewers and are the damage of a cable, a reduction in the sensitivity of a sensor, the degradation of the sensor, and the like, are expected, and frequent maintenance is requested. On the other hand, studies have been conducted to avoid effects of substances floating in sewers by installing contactless water level sensors at positions (for example, on the back sides of maintenance hole lids) away from water surfaces. However, a small and low-power-consumption water level sensor that may be installed in a narrow space within a maintenance hole has yet to be completed.

According to the embodiment, in order to address the aforementioned problems, an increase in a water level within a maintenance hole may be measured with low consumed power in a contactless manner. In addition, the standing wave radar device 1 may be downsized and reduced in weight without a change in the physical size of the standing wave radar device 1. It is, therefore, possible to quickly handle the flood of sewage and efficiently suppress the spread of flood disasters (especially urban flood disasters).

(2) The aforementioned embodiment describes the method in which the calculating section 7 calculates the regression lines of the power spectra of the synthesized wave and treats the inclinations of the calculated lines as the displacement-caused inclinations. By expressing the displacement-caused inclinations using the regression lines of the power spectra, it may be easy to remove effects of the displacement of the object to be measured and it may be possible to improve the accuracy of the distance measurement using the simple configuration.

(3) In addition, the aforementioned embodiment describes the method for analytically calculating the displacement-caused inclinations. Specifically, the method is to calculate the displacement components V of the power spectra using Equations (5) and (6). By analytically calculating the displacement-caused inclinations, it may be possible to improve the accuracy of the distance measurement using the simple configuration. By using both of the method using the regression lines and the method based on Equations (5) and (6), it may be possible to calculate the displacement-caused inclinations with high accuracy and improve the accuracy of the distance measurement.

(4) In the aforementioned embodiment, the displacement-caused inclinations for the real-part data and the imaginary-part data are removed from the power spectra. For example, the real-part analysis signal in which the real-part inclination has been removed from the power signal $p(f, x_1)$ of the real-part data is output, and the imaginary-part analysis signal in which the imaginary-part inclination has been removed from the power signal $p(f, x_2)$ of the imaginary-part data is output. By using the two types of analysis signals, the analysis signal of the complex number may be calculated with high accuracy. Thus, the accuracy of the distance measurement may be improved.

(5) In the aforementioned embodiment, the inclinations, caused by the displacement of the object to be measured, of the power signals p are removed. Specifically, in the case where the object to be measured is frequently displaced or frequently fluctuates, the accuracy of the distance measurement may be significantly improved, compared with the case where the displacement-caused inclinations are not removed. Thus, the accuracy of the water level measurement may be significantly improved by applying the aforementioned standing wave radar device 1 to the water level measurement system 20 for measuring a water level such as a water surface or a liquid surface, compared with existing techniques.

4. Modified Example

The aforementioned embodiment describes the distance measurement method such as the FMCW scheme using the standing wave. In the embodiment, however, even in a distance measurement method such as the FMCW scheme using a frequency difference (beat frequency), processes that are the same as those described in the embodiment may be applied. The distance measurement method such as the FMCW scheme using the beat frequency is to execute frequency modulation so that a line indicating a temporal change in the frequency of a transmitted wave forms a triangle and to measure a beat frequency $f_b$ that is the frequency difference between the transmitted wave and a reflected wave.

Relationships between the beat frequency $f_b$, a frequency modulation range $\Delta F$, a modulation cycle T, and reciprocation delay time $t_{delay}$ indicate that $f_b/t_{delay} = \Delta F/T$. In addition, the reciprocation delay time $t_{delay} = 2R/c$ (R is the distance from the standing wave radar device 1 to the object to be measured, and c is the speed of light). The shorter the distance R to the object to be measured, the lower the observed beat frequency $f_b$. In this method, in accordance with Equation (12), the observed beat frequency $f_b$ is significantly higher than the Doppler frequency $\Delta f$ (or the relationship of $f_b \gg \Delta f$ is established). Thus, by adding a process of removing the displacement-caused inclinations of the power spectra of the synthesized wave formed by synthesizing the transmitted wave with the reflected wave, the accuracy of the distance measurement may be improved.

$$p(t) = \cos(2\pi(fb + \Delta f)t) \quad (12)$$
$$\approx \cos(2\pi fb \cdot t) - \sin(2\pi fb \cdot t) \cdot 2\pi t \Delta f$$

The aforementioned embodiment describes the water level measurement system 20 in which the standing wave radar device 1 is separated from the control device 10. The functions of the control device 10, however, may be included in the standing wave radar device 1. In this case, the standing wave radar device 1 may be configured to output information of the distance d to the external output device 27, or the output device 27 may be included in the standing wave radar device 1.

In addition, in the case where the standing wave radar device 1 is separated from the control device 10, the standing wave radar device 1 may be connected to the control device 10 via a known network. For example, a server included in the network may function as the standing wave radar device 1, and a communication device configured to connect the standing wave radar device 1 to the network may be included in the standing wave radar device 1. Examples of the network are the Internet, a wireless communication network for mobile phones, and another digital wireless communication network. Multiple standing wave radar devices 1 may be installed at multiple locations, and the control device 10 may centrally manage information transmitted by the multiple standing wave radar devices 1. With this configuration, it may be possible to centrally manage water levels at multiple locations and quickly cope with the flood of sewage.

The aforementioned embodiment exemplifies the water level measurement system 20 that measures the liquid surface (water surface) as the object to be measured, but the specific object to be measured is not limited to this. For example, the aforementioned distance measuring device and the distance measurement method may be applied as an obstruction detection system for a vehicle and a distance measurement method by a human detection system. In addition, the effects described in the embodiment may be obtained without depending on the object to be measured in principle. The aforementioned embodiment is suitable to measure the distance between objects between which the relative distance changes, but the embodiment does not intend to be limited to an object that may move.

The distance measuring device, water level measurement system, and distance measurement method of the FMCW scheme using the standing wave measure the distance between the standing wave radar device 1 and the object to be measured, based on the distance spectrum of the synthesized wave. On the other hand, the distance measuring device, water level measurement system, and distance measurement method of the FMCW scheme using the frequency difference measure the distance between the standing wave radar device 1 and the object to be measured, based on the beat frequency of the synthesized wave. The aforementioned distance measuring device, the water level measurement system, and the distance measurement method are applicable to the FMCW scheme using the standing wave and the FMCW scheme using the frequency difference.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A distance measuring device comprising:
   one or more processors configured to:
   transmit a frequency swept electromagnetic wave to an object;
   detect a reflected wave reflected on a surface of the object;
   obtain a synthesized wave by synthesizing the frequency swept electromagnetic wave and the reflected wave for calculating, based on the synthesized wave, a distance to the object;
   calculate a power spectrum inclination of the synthesized electromagnetic wave caused the displacement of the object; and
   calculate the distance based on removing the displacement-caused inclination from the power spectrum.

2. The distance measuring device according to claim 1, wherein the one or more processors is configured to calculate a regression line, corresponding to the displacement-caused inclination, of the power spectrum of the synthesized wave.

3. The distance measuring device according to claim 1, further comprising:
   an orthogonal wave detector configured to separate the synthesized wave into real-part data and imaginary-part data,
   wherein the one or more processors is configured to calculate a real-part inclination corresponding to the real-part data and an imaginary-part inclination corresponding to the imaginary-part data.

4. The distance measuring device according to claim 1, wherein the one or more processors are configured to calculate, based on Equation A provided below, a displacement component (V), corresponding to the displacement-caused inclination, of the power spectrum in a real-part region of the synthesized wave and calculate, based on Equation B provided below, a displacement component (V), corresponding to the displacement-caused inclination, of the power spectrum in an imaginary-part region of the synthesized wave, while $$V = 2A^2 \sin\left(\frac{4\pi f d_0}{c} - \phi\right) \cdot \frac{4\pi f_0 B}{c} t, \text{ and} \quad \text{Equation A}$$

$$V = 2A^2 \cos\left(\frac{4\pi f d_0}{c} - \phi\right) \cdot \frac{4\pi f_0 B}{c} t, \quad \text{Equation B}$$

where (A) is an amplitude level of the transmitted wave, (f) is the frequency of the transmitted wave, ($d_0$) is a central value of the distance, (c) is the speed of light, ($\phi$) is the amount of a change in the phase due to the reflection, ($f_0$) is a central frequency of the transmitted wave, (B) is a velocity coefficient that gives the displacement $\Delta d$ of the object to be measured, and (t) is time.

5. The distance measuring device according to claim 1, wherein the object is a liquid surface.

6. A liquid level measurement system comprising:
   a detector configured to detect a reflected wave reflected on a liquid surface;
   one or more processors configured to:
   obtain a synthesized wave by synthesizing the frequency swept electromagnetic wave and the reflected wave for calculating, based on the synthesized wave, a distance to the liquid surface;
   calculate a power spectrum inclination of the synthesized electromagnetic wave caused by the displacement of the liquid surface; and
   calculate the distance based on removing the displacement-caused inclination from the power spectrum.

7. The liquid level measurement system according to claim 6, wherein the one or more processors is configured to calculate a regression line, corresponding to the displacement-caused inclination, of the power spectrum of the synthesized wave.

8. The liquid level measurement system according to claim 6, further comprising:
   an orthogonal wave detector configured to separate the synthesized wave into real-part data and imaginary-part data,
   wherein the one or more processors is configured to calculate a real-part inclination corresponding to the real-part data and an imaginary-part inclination corresponding to the imaginary-part data.

9. The liquid level measurement system according to claim 6,
   wherein the one or more processors is configured to calculate, based on Equation A provided below, a displacement component (V), corresponding to the displacement-caused inclination, of the power spectrum in a real-part region of the synthesized wave and calculates, based on Equation B provided below, a displacement component (V), corresponding to the displacement-caused inclination, of the power spectrum in an imaginary-part region of the synthesized wave, while $$V = 2A^2 \sin\left(\frac{4\pi f d_0}{c} - \phi\right) \cdot \frac{4\pi f_0 B}{c} t, \text{ and} \quad \text{Equation A}$$

$$V = 2A^2 \cos\left(\frac{4\pi f d_0}{c} - \phi\right) \cdot \frac{4\pi f_0 B}{c} t, \quad \text{Equation B}$$

where (A) is an amplitude level of the transmitted wave, (f) is the frequency of the transmitted wave, ($d_0$) is a central value of the distance, (c) is the speed of light, ($\phi$) is the amount of a change in the phase due to the reflection, ($f_0$) is a central frequency of the transmitted wave, (B) is a velocity coefficient that gives the displacement $\Delta d$ of the liquid surface, and (t) is time.

10. The liquid level measurement system according to claim 6, wherein the object is a water surface in a maintenance hole.

11. A computer-implemented distance measurement method of transmitting a frequency swept electromagnetic wave to an object, detecting a reflected wave reflected on a surface of the object, obtaining a synthesized wave by synthesizing the frequency swept electromagnetic wave and the reflected wave for measuring, based on the synthesized wave, a distance to the object, the method comprising:

calculating a power spectrum inclination of a synthesized electromagnetic wave caused by the displacement of the object; and calculating the distance based on removing the displacement-caused inclination from the power spectrum.

12. The distance measurement method according to claim 11, further comprising:

calculating a regression line, corresponding to the displacement-caused inclination, of the power spectrum of the synthesized wave.

13. The distance measurement method according to claim 11, further comprising:

separating the synthesized wave into real-part data and imaginary-part data; and calculating a real-part inclination corresponding to the real-part data and an imaginary-part inclination corresponding to the imaginary-part data.

14. The distance measurement method according to claim 11, further comprising:

calculating, based on Equation A provided below, a displacement component (V), corresponding to the displacement-caused inclination, of the power spectrum in a real-part region of the synthesized wave and calculating, based on Equation B provided below, a displacement component (V), corresponding to the displacement-caused inclination, of the power spectrum in an imaginary-part region of the synthesized wave, while $$V = 2A^2 \sin\left(\frac{4\pi f d_0}{c} - \phi\right) \cdot \frac{4\pi f_0 B}{c} t, \text{ and} \quad \text{Equation A}$$

$$V = 2A^2 \cos\left(\frac{4\pi f d_0}{c} - \phi\right) \cdot \frac{4\pi f_0 B}{c} t, \quad \text{Equation B}$$

where (A) is an amplitude level of the transmitted wave, (f) is the frequency of the transmitted wave, ($d_0$) is a central value of the distance, (c) is the speed of light, ($\phi$) is the amount of a change in the phase due to the reflection, ($f_0$) is a central frequency of the transmitted wave, (B) is a velocity coefficient that gives the displacement $\Delta d$ of the object to be measured, and (t) is time.

15. The distance measurement method according to claim 11, wherein the object is a liquid surface.

16. A computer-implemented method of measuring a distance comprising:

transmitting a frequency-swept modulated electromagnetic wave toward a liquid surface;

receiving a reflected wave from the liquid surface;

obtaining a synthesized wave by synthesizing the frequency swept electromagnetic wave and the reflected wave for measuring, based on the synthesized wave, a distance to the liquid surface;

calculating a power spectrum inclination of the synthesized electromagnetic wave caused by the displacement of the liquid surface; and calculating the distance based on removing the displacement-caused inclination from the power spectrum.

17. The method of claim 16 further comprising separating the synthesized wave into real-part data and imaginary-part data.

18. The method of claim 17 further comprising detecting a real-part power signal of the real-part data and an imaginary-part power signal of the imaginary-part data.

19. The method of claim 18 further comprising generating an analysis signal by removing a real-part inclination from the real-part power signal.

20. The method of claim 16 wherein the liquid surface is a water surface in a manhole.

* * * * *